United States Patent
Yu et al.

(10) Patent No.: US 8,355,684 B2
(45) Date of Patent: Jan. 15, 2013

(54) CHANNEL DETERMINATION APPARATUS AND METHOD OF BROADCAST REVEIVER

(75) Inventors: Hyun Seok Yu, Seoul (KR); In Kwon Paik, Yongin-si (KR); Byung Tae Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 264 days.

(21) Appl. No.: 12/828,520

(22) Filed: Jul. 1, 2010

(65) Prior Publication Data

US 2011/0003570 A1  Jan. 6, 2011

(30) Foreign Application Priority Data

Jul. 1, 2009  (KR) .................. 10-2009-0059572

(51) Int. Cl.
  *H04B 1/18* (2006.01)
(52) U.S. Cl. .................... 455/154.1; 455/179.1
(58) Field of Classification Search ............. 455/63.1, 455/114.2, 296, 67.11, 67.13, 154.1, 179.1
  See application file for complete search history.

(56) References Cited

U.S. PATENT DOCUMENTS

| | | | | |
|---|---|---|---|---|
| 5,044,010 A | * | 8/1991 | Frenkiel et al. | 455/464 |
| 5,148,548 A | * | 9/1992 | Meche et al. | 455/514 |
| 5,197,093 A | * | 3/1993 | Knuth et al. | 455/464 |
| 5,418,839 A | * | 5/1995 | Knuth et al. | 455/464 |
| 6,678,508 B1 | * | 1/2004 | Koilpillai et al. | 455/137 |
| 7,768,966 B2 | * | 8/2010 | Yoon et al. | 370/329 |
| 2004/0259502 A1 | | 12/2004 | Weidner et al. | |
| 2008/0171527 A1 | | 7/2008 | Masoian | |

FOREIGN PATENT DOCUMENTS

KR    10-0740170 B1   7/2007
WO    2006/043136 A1  4/2006

* cited by examiner

*Primary Examiner* — Sonny Trinh
(74) *Attorney, Agent, or Firm* — Jefferson IP Law, LLP

(57) ABSTRACT

A channel determination apparatus and method for a broadcast receiver are provided. The method includes estimating, when the broadcast receiver operates in a sleep state over a preset time period, inter-modulation distortion interference of a plurality of channels by scanning the channels, and receiving, when the sleep state is transitioned to an active state, broadcast data on a channel having the least inter-modulation distortion interference. Accordingly, the inter-modulation distortion interference of individual channels is taken into account to select an optimum channel, thereby resulting in improvement of channel determination accuracy.

15 Claims, 8 Drawing Sheets

CHANNEL DETERMINATION APPARATUS AND METHOD OF BROADCAST REVEIVER

PRIORITY

This application claims the benefit under 35 U.S.C. §119 (a) of a Korean patent application filed on Jul. 1, 2009 in the Korean Intellectual Property Office and assigned Serial No. 10-2009-0059572, the entire disclosure of which is hereby incorporated by reference.

BACKGROUND OF THE INVENTION

1. Field of the Invention

The present invention relates to a broadcast system. More particularly, the present invention relates to an apparatus and method for a broadcast receiver to determine a channel in a broadcast system.

2. Description of the Related Art

Broadcast services are at the height of real digitalization, Very High Frequency (VHF), and a high quality era in the information society of the $21^{st}$ century. Recently, with the widespread use of multimedia devices such as high quality digital Televisions (TVs), Portable Multimedia Players (PMPs), and portable broadcast devices, research has been conducted to provide various types of broadcast services.

A broadcast service is provided through a plurality of channels in a broadcast system. That is, a broadcast transmitter broadcasts the service over multiple channels such that broadcast receivers can receive the service over one of the channels. At this time, the broadcast receiver measures Received Signal Strength Indicators (RSSIs) of the individual channels and selects one of the channels based on the measured RSSIs. For example, the broadcast receiver compares the RSSIs of the individual channels or Signal-to-Interference plus Noise Ratios (SINRs) dependent on the RSSIs with each other to select the best channel. The best channel is the channel of which RSSI or SNR is highest as compared to other channels.

However, the broadcast system according to the related art has a drawback in that channel determination accuracy is low because the RSSIs of the individual channels vary depending on the communication environment. This is because the broadcast receiver according to the related art takes into account the interference between the channels only for using the selected channel but not for selecting the channel.

Therefore, a need exists for an apparatus and method for taking into account per-channel interference to select one of a plurality of channels of a broadcast receiver.

SUMMARY OF THE INVENTION

An aspect of the present invention is to address at least the above-mentioned problems and/or disadvantages and to provide at least the advantages described below. Accordingly, an aspect of the present invention is to provide a channel determination apparatus and method of a broadcast receiver that is capable of improving the channel determination accuracy.

In accordance with an aspect of the present invention, a channel determination method of a broadcast receiver is provided. The method includes estimating, when the broadcast receiver operates in a sleep state over a preset time period, inter-modulation distortion interference of a plurality of channels by scanning the channels, and receiving, when the sleep state is transitioned to an active state, broadcast data on a channel having the least inter-modulation distortion interference.

The estimating of the inter-modulation distortion interference may include measuring received signal strength indicators of the channel, and predicting the inter-modulation distortion interference of the channels by comparing the received signal strength indicators.

The estimating of the inter-modulation distortion interference may include determining adjacent channel interference of other channels to a specific channel by comparing the received signal strength indicators of the specific channel and the other channels.

The receiving of the broadcast data may include determining, if each of the received signal strength indicators is greater than or equal to a minimum threshold, estimated signal to interference plus noise ratios of the channels based on the inter-modulation distortion interference and the adjacent channel interference, and selecting the channel having the least estimated signal to interference plus noise ratio among the channels.

In accordance with another aspect of the present invention, a channel determination apparatus of a broadcast receiver is provided. The apparatus includes a channel scanner for scanning, when the broadcast receiver operates in a sleep state over a preset time period, a plurality of channels to measure received signal strength indicators of the channels, an inter-modulation distortion estimator for estimating inter-modulation distortion interference of individual channels by comparing the received signal strength indicators with each other, and a channel selector for selecting the channel having the least inter-modulation distortion interference among the channels for receiving broadcast data.

The channel determination apparatus may include an adjacent channel interference calculator which determines adjacent channel interference of other channels to a specific channel by comparing the received signal strength indicators of the specific channel and the adjacent channels of the specific channel.

The channel selector may determine, if each of the received signal strength indicators is greater than or equal to a minimum threshold, estimated signal to interference plus noise ratios of the channels based on the inter-modulation distortion interference and the adjacent channel interference based on the inter-modulation distortion interference and the adjacent channel interference, and selects the channel having the least estimated signal to interference plus noise ratio among the channels.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
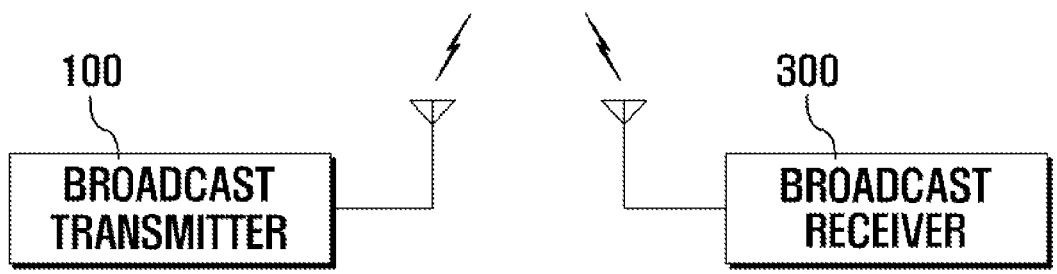
FIG. 1 is a schematic diagram illustrating a channel determination method of a broadcast system according to an exemplary embodiment of the present invention.
Figure 2:
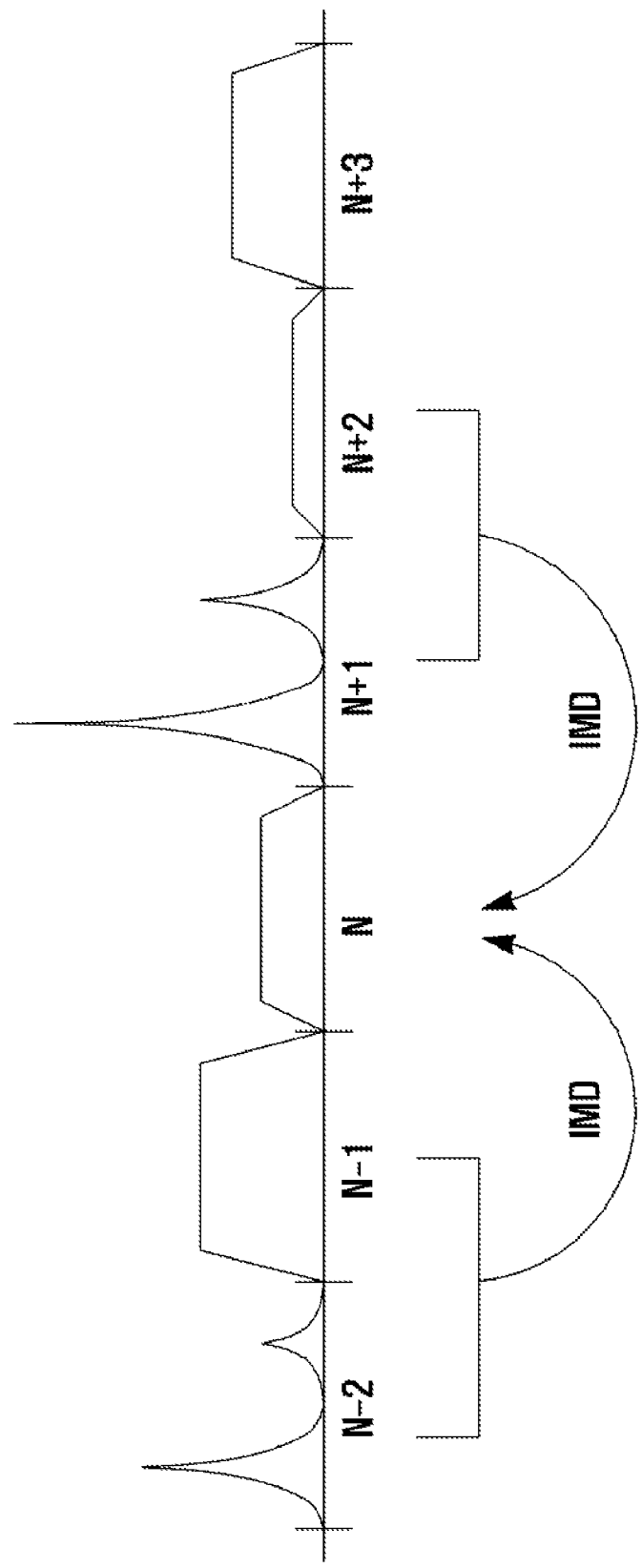
FIG. 2 is a graph illustrating characteristics of channels used in a broadcast system according to an exemplary embodiment of the present invention.

FIG. 1 is a schematic diagram illustrating a channel determination method of a broadcast system according to an exemplary embodiment of the present invention. FIG. 2 is a graph illustrating characteristics of channels used in a broadcast system according to an exemplary embodiment of the present invention.

Referring to FIG. 1, the broadcast system includes a broadcast transmitter 100 and a broadcast receiver 300. The broadcast transmitter 100 provides the broadcast receiver 300 with a broadcast service over multiple channels as illustrated in FIG. 2. The channels are distinguished by a frequency band. Here, the broadcast transmitter 100 may transmit broadcast data in the form of an analog signal or a digital signal. The broadcast receiver 300 selects an optimal channel among the multiple channels to receive the broadcast service. That is, the broadcast receiver 300 determines an optimal channel for receiving the broadcast service. At this time, the broadcast receiver 300 may measure a Received Signal Strength Indicator (RSSI) per channel by scanning all of the channels.

In the broadcast system, the channels may interfere with each other. That is, when the broadcast transmitter 100 transmits broadcast data over the multiple channels, interference between adjacent channels may occur. For example, an $N^{th}$ channel may be subjected to interference from at least one of its neighbor channels, i.e., $(N-1)^{th}$ and $(N+1)^{th}$ channels. Also, the $N^{th}$ channel may be subject to interference caused by Inter-modulation distortion of the broadcast data on the $(N-2)^{th}$ and $(N-1)^{th}$ channels. In the same manner, the $N^{th}$ channel may be subjected to interference caused by inter-modulation distortion of the broadcast data on the $(N+1)^{th}$ and $(N+2)^{th}$ channels.

Figure 3:
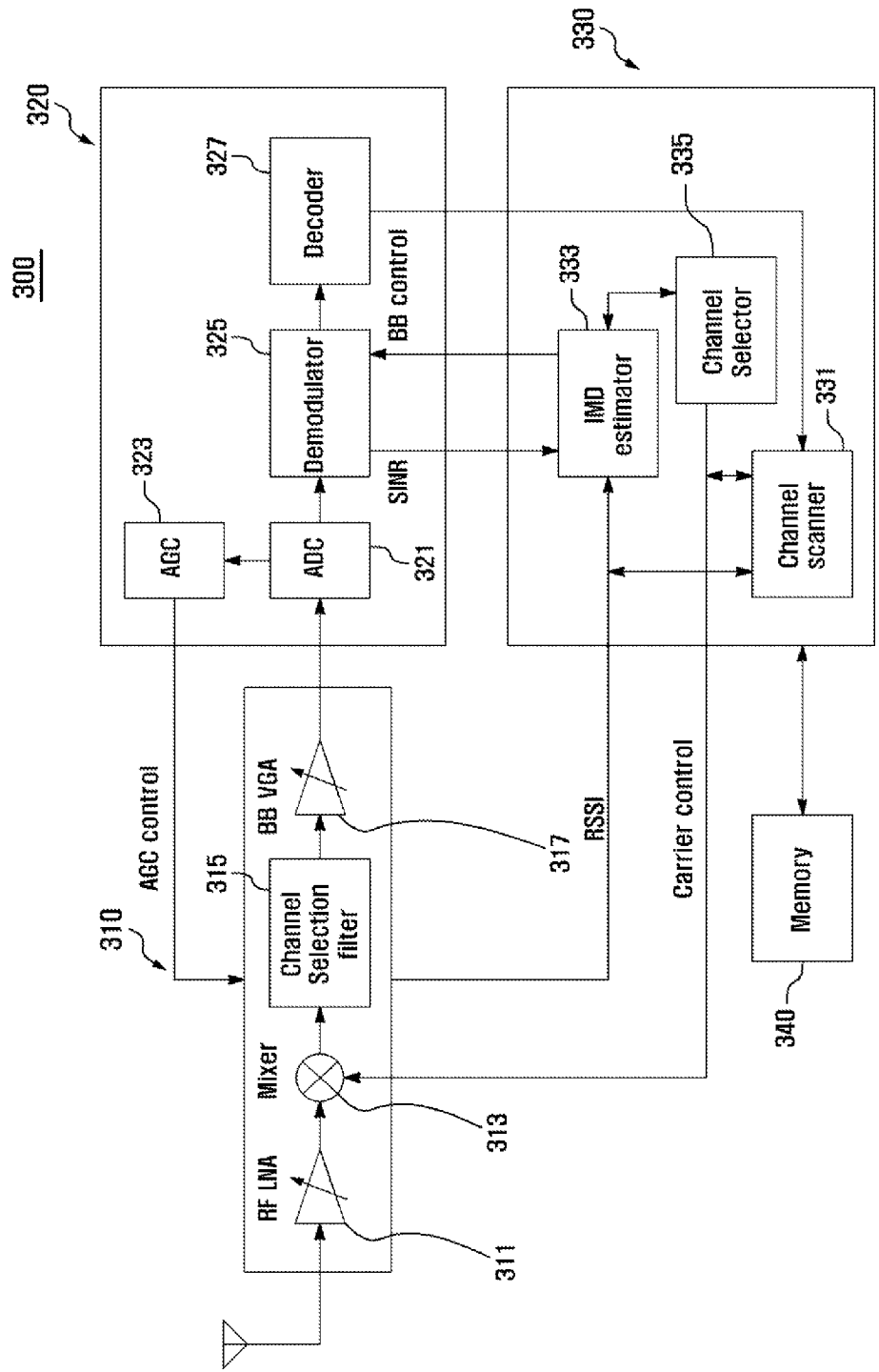
FIG. 3 is a block diagram illustrating a configuration of a broadcast receiver according to an exemplary embodiment of the present invention.
Figure 4:
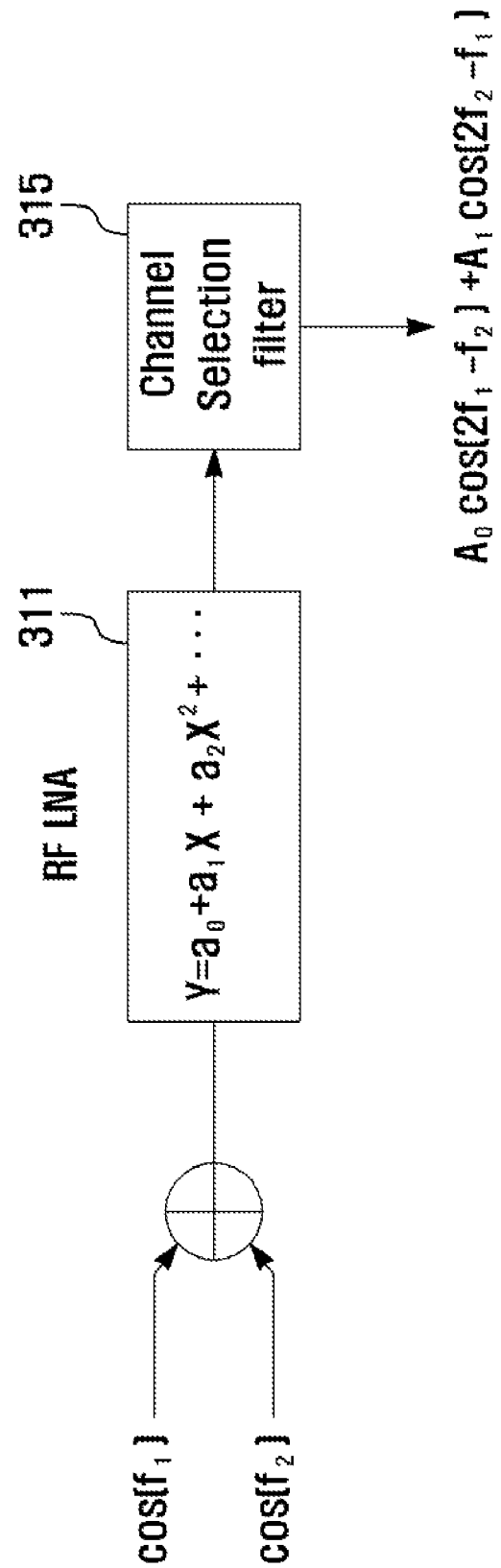
FIG. 4 is a diagram illustrating a mechanism for determining inter-modulation distortion in a broadcast receiver according to an exemplary embodiment of the present invention.

FIG. 3 is a block diagram illustrating a configuration of a broadcast receiver according to an exemplary embodiment of the present invention. FIG. 4 is a diagram illustrating a mechanism for determining inter-modulation distortion in a broadcast receiver according to an exemplary embodiment of the present invention.

Referring to FIG. 3, the broadcast receiver 300 includes a data receiving unit 310, a data processing unit 320, a control unit 330, and a memory unit 340.

The data receiving unit 310 receives radio signals. The data receiving unit 310 includes a Radio Frequency Low-Noise Amplifier (RF LNA) 311, a mixer 313, a channel selection filter 315, and a Baseband Variable Gain Amplifier (BB VGA) 317. The RF LNA 311 amplifies a broadcast signal while maintaining noise at a low level. That is, the RF LNA 311 reduces the noise of the broadcast signal. The mixer 313 mixes an oscillation signal with the broadcast signal. The channel selection filter 315 passes the broadcast signal of a specific channel and cuts out the broadcast signals of other broadcast channels. The BB VGA 317 amplifies the filtered broadcast signal.

Referring to FIG. 4, the RF LNA 311 is capable of modeling the broadcast signals received over a plurality of channels. Here, the RF LNA 311 may model the broadcast signals as a Volterra series polynomial, i.e., $Y=a_0+a_1X+a_2X^2+\ldots$ With this modeling, the channel selection filter 315 may pass a frequency different from the specific channel, e.g., the interference signal to the broadcast signals of other channels of '$f_1$' and '$f_2$' i.e., $A_0\cos(2f_1-f_2)+A_1\cos(2f_2-f_1)$, when filtering the broadcast signal of the specific channel. Here, the interference signal may be caused by the inter-modulation of the broadcast signals of other channels. That is, if the frequency of a specific channel is identical to that of another channel, i.e., $2f_1-f_2$ or $2f_2-f_1$, the inter-modulation of the other channel may cause interference with the specific channel.

The data processing unit 320 processes the broadcast signals. The data processing unit 320 includes an Analog to Digital Converter (ADC) 321, an Automatic Gain Controller (AGC) 323, a demodulator 325, and a decoder 327. The ADC 321 converts the broadcast signal in analog format to the broadcast data in digital format. The AGC 323 determines the power gain (G) to maintain the received power of the broadcast data at a reference power level and controls the data receiving unit 310. The demodulator 325 performs demodulation on the broadcast data, and the decoder 327 performs decoding on the demodulated broadcast data.

The control unit 330 controls entire operations of the broadcast receiver 300. The control unit 330 includes a channel scanner 331, an Inter-Modulation Distortion (IMD) estimator 333, and a channel selector 335. The channel scanner 331 scans a plurality of channels on which the data receiving unit 310 may receive radio signals. The channel scanner 331 measures the RSSIs of the individual channels. The IMD estimator 333 estimates interference between the channels. The IMD estimator 333 may also estimate a Signal-to-Interference plus Noise Ratio (SINR) per channel. The channel selector 335 selects one of the channels and notifies the data receiving unit 310 of the selected channel to receive broadcast data thereon. That is, when the broadcast data reception performance degrades below a preset reference performance level, the control unit 330 controls to determine the channel. The control unit 330 manages a channel information table including per-channel RSSIs, a service list, and the SINR.

The memory unit 340 may include program and data memories. The program memory stores the programs for controlling general operations of the broadcast receiver 300. The data memory stores the data generated while the programs are running.

Figure 5:
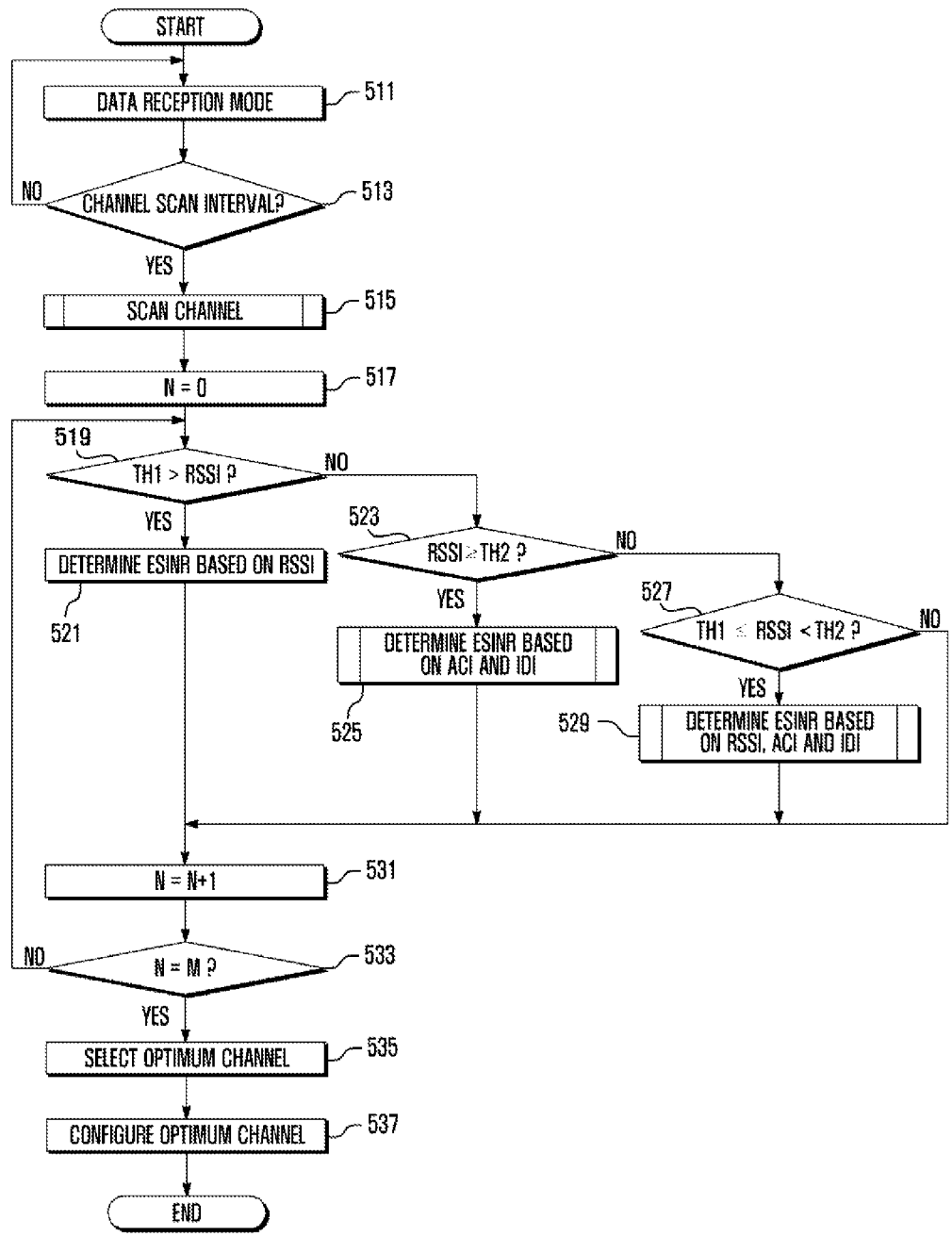
FIG. 5 is a flowchart illustrating a channel determination method of a broadcast receiver according to an exemplary embodiment of the present invention.

FIG. 5 is a flowchart illustrating a channel determination method of a broadcast receiver according to an exemplary embodiment of the present invention.

Referring to FIG. 5, the control unit 330 first turns on the data receiving mode in step 511. In a data receiving mode, the control unit 330 determines a channel scan interval in step 513. If the channel scan interval has expired, the control unit 330 performs channel scanning in step 515. The control unit 330 scans a plurality of channels (e.g., M channels) on which the broadcast transmitter 100 provides the broadcast service. Here, the control unit 330 measures the RSSI of each channel, determines the service list per service, and updates the channel information table. At this time, the memory unit 340 may store the channel information table formed as shown in Table 1 below.

TABLE 1

| Channel Index | RSSI | — | Service List |
|---|---|---|---|
| 0 | −35 | — | Program A, B |
| 1 | −78 | — | N/A |
| 2 | −57 | — | Program C |
| . | . | . | . |
| . | . | . | . |
| . | . | . | . |
| N − 1 | −65 | — | N/A |
| N | −88 | — | Program B |
| N + 1 | −45 | — | Program C |
| . | . | . | . |
| . | . | . | . |
| . | . | . | . |
| M − 1 | −67 | — | Program F |

A channel scanning procedure is described in more detail below with reference to FIG. 6.

Figure 6:
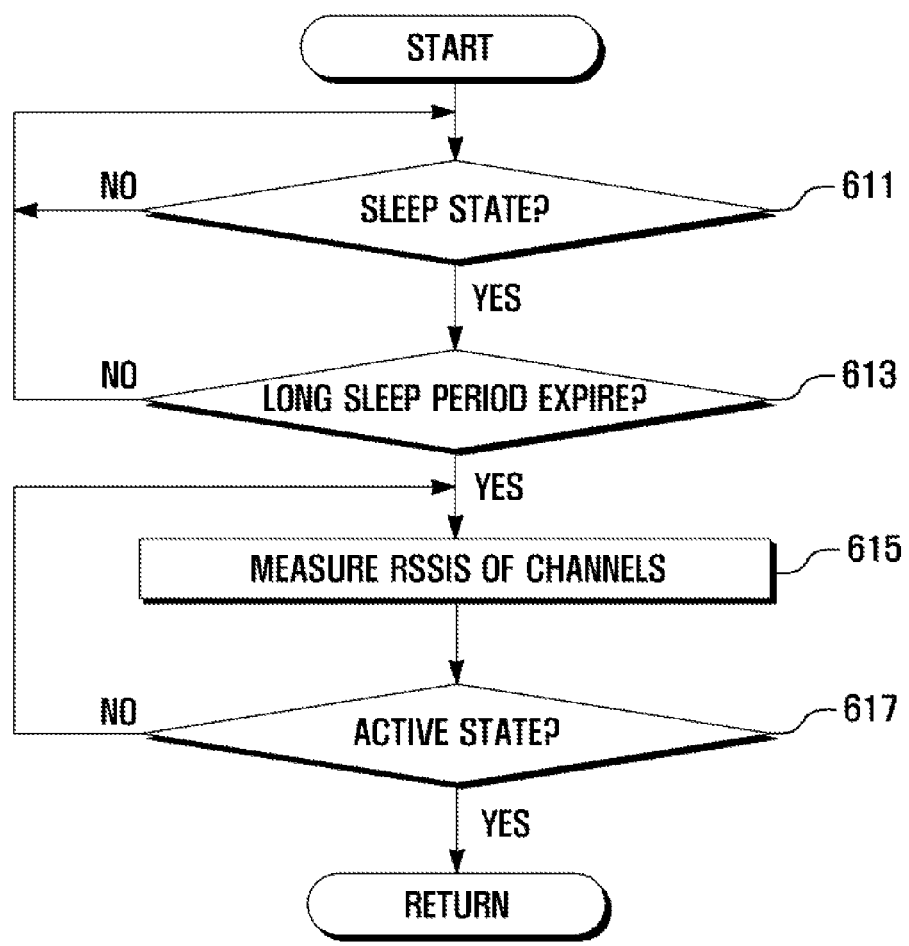
FIG. 6 is a flowchart illustrating a channel scanning procedure according to an exemplary embodiment of the present invention.

FIG. 6 is a flowchart illustrating a channel scanning procedure according to an exemplary embodiment of the present invention.

Referring to FIG. 6, if a channel scan interval has expired, the control unit 330 determines whether the broadcast receiver 300 is in a sleep state in step 611. If the broadcast receiver 300 is in the sleep state, the control unit 330 monitors to detect a long sleep period expiration in step 613. If the long sleep period has expired, the control unit 330 scans the channels to measure the RSSI of each channel in step 615. At this time, the control unit 330 may verify the service list of each channel. Next, the control unit 330 monitors to determine an operation state transition from the sleep state to an active state in step 617.

Returning to FIG. 5, if the operation state transition to the activate state is determined in step 617 in FIG. 6, the control unit 330 looks up the channel information table to determine the $N^{th}$ channel in step 517. In an exemplary implementation, it is assumed that the $N^{th}$ channel is assigned to the channel index '0'.

The control unit 330 determines whether the RSSI of the $N^{th}$ channel is less than a preset minimum threshold (TH1) in step 519. If the RSSI of the $N^{th}$ channel is less than the minimum threshold (TH1), the control unit 330 determines an Estimated SINR (ESINR) of the $N^{th}$ channel using the RSSI in step 521. The ESINR may be determined using Equation (1) below:

$$ESINR = 10 \log 10(10^{(P_N - N_o)/10}) \quad (1)$$

where $P_N$ denotes the RSSI of the $N^{th}$ channel, and No denotes a thermal background noise level.

Otherwise, if the RSSI of the $N^{th}$ channel is not less than the minimum threshold (TH1), the control unit 330 determines whether the RSSI of the $N^{th}$ channel is equal to or greater than a maximum threshold (TH2) in step 523. If the RSSI of the $N^{th}$ channel is equal to or greater than the maximum threshold (TH2), the control unit 330 determines the ESINR of the $N^{th}$ channel with estimation of interference in step 525.

An ESINR calculation procedure based on an Adjacent Channel Interference (ACI) and an Inter-Modulation Distortion (IMD) Interference (IDI) is described in more detail below with reference to FIG. 7.

Figure 7:
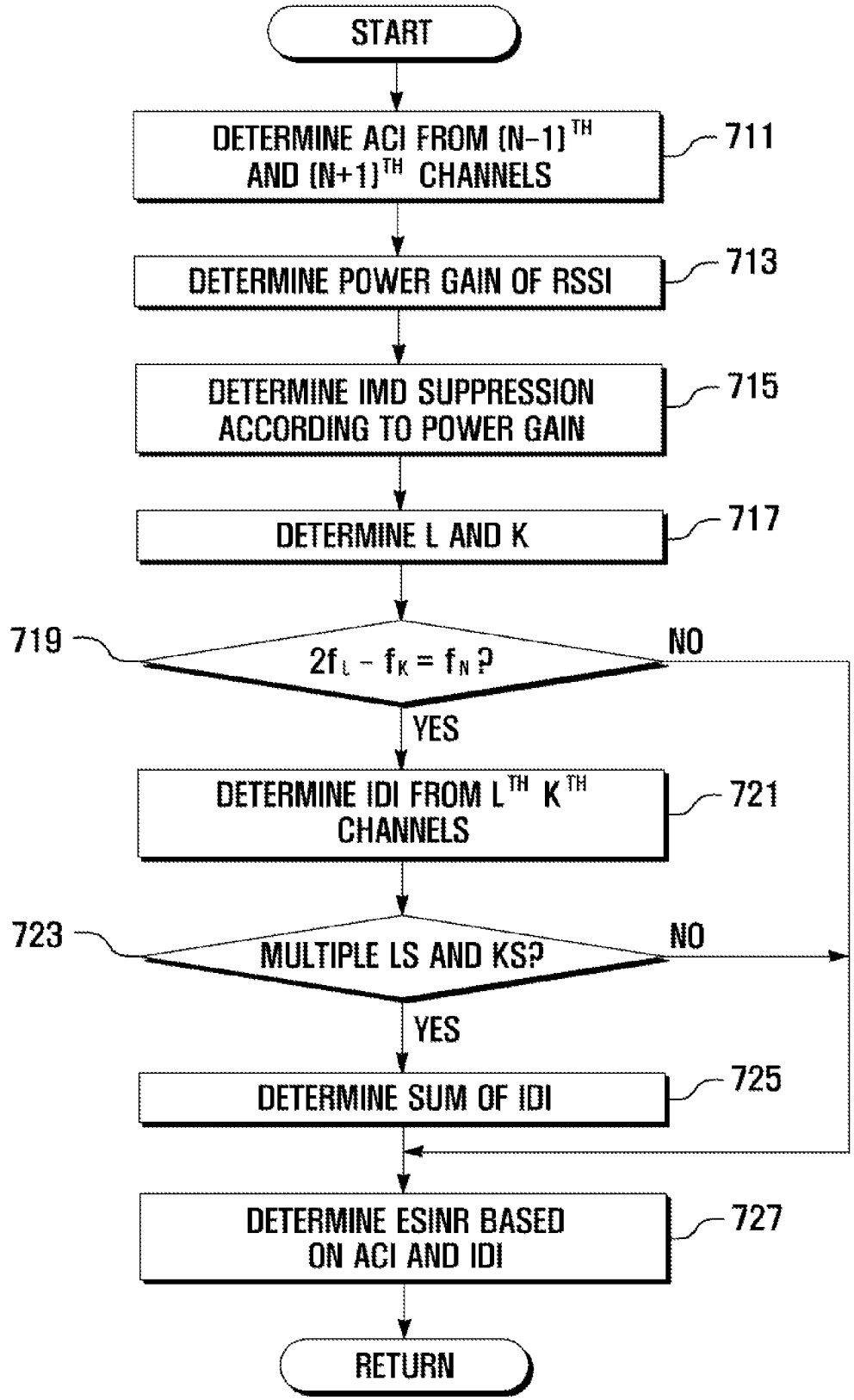
FIG. 7 is a flowchart illustrating an Adjacent Channel Interference (ACI) and an Inter-Modulation Distortion (IMD) Interference (IDI)-based Estimated Signal-to-Interference plus Noise Ratio (ESINR) calculation procedure according to an exemplary embodiment of the present invention.

FIG. 7 is a flowchart illustrating an ACI and an IDI-based ESINR calculation procedure according to an exemplary embodiment of the present invention.

Referring to FIG. 7, if the RSSI of the $N^{th}$ channel is equal to or greater than the maximum threshold (TH2), the control unit 330 determines the ACI from the adjacent channels of the $N^{th}$ channel in step 711. This is because, if the broadcast signal is not completely cut off at the channel selection filter 315, the broadcast signal of the adjacent channels affects the $N^{th}$ channel as interference. Here, the control unit 330 determines the ACI using the RSSIs of the adjacent channels, i.e., $(N−1)^{th}$ and $(N+1)^{th}$ channels that are retrieved from the channel information table. The ACI may be determined using Equation (2) below:

$$P_{ACI_{N-1}} = P_{N-1} - L_F$$

$$P_{ACI_{N+1}} = P_{N+1} - L_F \quad (2)$$

where $P_{ACI_{N-1}}$ denotes the ACI of the $(N−1)^{th}$ channel to the $N^{th}$ channel, $P_{N-1}$ denotes the RSSI of the $(N−1)^{th}$ channel, $P_{ACI_{N+1}}$ denotes the ACI of the $(N+1)^{th}$ channel to the $N^{th}$ channel, $P_{N+1}$ denotes the RSSI of the $(N+1)^{th}$ channel, and $L_F$ denotes the filter loss of the channel selection filter.

The control unit 330 determines the power gain using the RSSI of the $N^{th}$ channel in step 713. The power gain may be determined using Equation (3) below. The control unit 330 determines IMD suppression ($IMD_S$) according to the power gain in step 715. That is, the control unit 330 determines a suppression probability of the interference caused by inter-modulation. The inter-modulation distortion interference suppression probability may be stored within the memory unit 340 in the form of a gain information table.

$$G = P_{ADC} - P_N \quad (3)$$

where $P_{ADC}$ denotes a preset reference power of the AGC 323.

The control unit 330 determines at least one pair of an $L^{th}$ channel and a $K^{th}$ channel in step 717. That is, the control unit 330 determines at least one pair of the $L^{th}$ channel and the $K^{th}$ channel among M channels having indices from '0' to 'M−1'. Here, L may be a value greater or less than K. The control unit 330 compares the frequency of the $N^{th}$ channel with those of the $L^{th}$ channel and the $K^{th}$ channel to determine whether the value obtained by subtracting the frequency of the $K^{th}$ channel from two-fold of the frequency of the $L^{th}$ channel is equal to the frequency of the $N^{th}$ channel in step 719. That is, the control unit 330 determines whether the frequencies of the $N^{th}$ channel, the $L^{th}$ channel, and the $K^{th}$ channel fulfill a preset condition of Equation (4) below:

$$2f_L - f_k = f_N \quad (4)$$

where $f_N$ denotes the frequency of the $N^{th}$ channel, $f_L$ denotes the frequency of the $L^{th}$ channel, and $f_K$ denotes the frequency of the $K^{th}$ channel.

If the value obtained by subtracting the frequency of the $K^{th}$ channel from two-fold of the frequency of the $L^{th}$ channel is equal to the frequency of the $N^{th}$ channel in step 719, the control unit 330 determines the IDI of the $L^{th}$ channel and the $K^{th}$ channel to the $N^{th}$ channel in step 721. The IDI may be determined using RSSIs of the $L^{th}$ channel and the $K^{th}$ channel retrieved from the channel information table. That is, the control unit 330 determines the IDI by subtracting the $IMD_S$ from the average of the RSSIs of the $L^{th}$ channel and the $K^{th}$ channel. The IDI may be determined using Equation (5) below:

$$IDI = \frac{P_L + P_K}{2} - IMD_S \quad (5)$$

where $P_L$ denotes the RSSI of the $L^{th}$ channel, and $P_K$ denotes the RSSI of the $K^{th}$ channel.

The control unit 330 determines whether multiple pairs of the $L^{th}$ and $K^{th}$ channels exist in step 723. If there are multiple pairs of the $L^{th}$ channel and the $K^{th}$ channel, e.g., C pairs of the $L^{th}$ channel and the $K^{th}$ channel exist, the control unit 330 determines the sum of IDIs of the C pairs to the $N^{th}$ channel in step 725. The sum of the IDIs may be determined using Equation (6) below:

$$IDI_N = IDI_{N_0} + IDI_{N_1} + \ldots + IDI_{N_{c-1}} \quad (6)$$

The control unit 330 determines the ESINR of the $N^{th}$ channel in step 727. Here, the control unit 330 determines the ESINR of the $N^{th}$ channel using the ACI and the IDI. The ESINR may be determined using Equation (7) below:

$$ESINR = 10\log 10\left(\frac{1}{1 + 10^{(IDI_N - N_0)/10} + 10^{(P_{ACI_{N+1}} - N_0)/10} + 10^{(P_{ACI_{N-1}} - N_0)/10}}\right) \quad (7)$$

Returning to FIG. 5, if the RSSI is not greater than nor equal to the maximum threshold (TH2) in step 523, the control unit 330 determines whether the RSSI is greater than or equal to the minimum threshold (TH1) and less than the maximum threshold (TH2) in step 527. If the RSSI is greater than or equal to the minimum threshold (TH1) and less than the maximum threshold (TH2), the control unit 330 determines the ESINR of the $N^{th}$ channel by estimating the interference using RSSI in step 529.

An ESINR determination procedure based on an RSSI, an ACI, and an IDI is described in more detail below with reference to FIG. 8.

Figure 8:
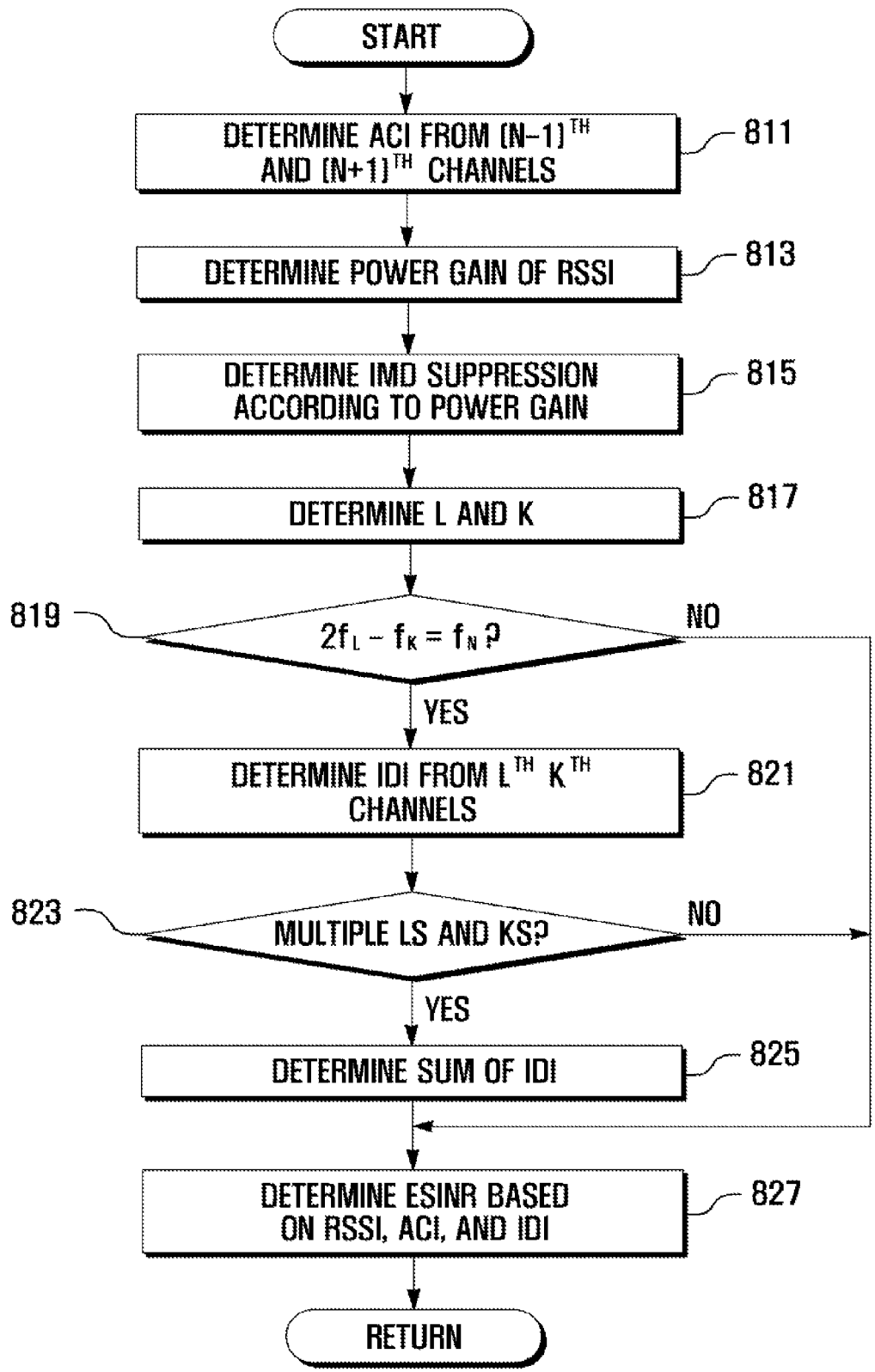
FIG. 8 is a flowchart illustrating a procedure for determining a Received Signal Strength Indicators (RSSI), an ACI, and an IDI-based ESINR according to an exemplary embodiment of the present invention.

FIG. 8 is a flowchart illustrating a procedure for determining an RSSI, an ACI, and an IDI-based ESINR according to an exemplary embodiment of the present invention.

Referring to FIG. 8, if the RSSI of the $N^{th}$ channel is greater than or equal to the minimum threshold (TH1) and less than the maximum threshold (TH2) in step 527 of FIG. 5, the control unit 330 determines the ACI from the adjacent channels of the $N^{th}$ channel in step 811. This is because, if the broadcast signal is not completely cut off at the channel selection filter 315, the broadcast signal of the adjacent channels affects the $N^{th}$ channel as interference. Here, the control unit 330 determines the ACI using the RSSIs of the adjacent channels, i.e., $(N-1)^{th}$ and $(N+1)^{th}$ channels that are retrieved from the channel information table. The ACI may be determined using Equation (8) below.

$$P_{ACI_{N-1}} = P_{N-1} - L_F$$

$$P_{ACI_{N+1}} = P_{N+1} - L_F \quad (8)$$

The control unit 330 determines the power gain using the RSSI of the $N^{th}$ channel in step 813. The power gain may be determined using Equation (9) below. The control unit 330 determines $IMD_S$ according to the power gain in step 815. The $IMD_S$ corresponding to the power gain may be stored within the memory unit 340 in the form of a preset gain information table. Accordingly, the control unit 330 may determine the $IMD_S$ corresponding to the power gain in the gain information table.

$$G = P_{ADC} - P_N \quad (9)$$

The control unit 330 determines at least one pair of the $L^{th}$ channel and the $K^{th}$ channel in step 817. That is, the control unit 330 determines at least one pair of the $L^{th}$ channel and the $K^{th}$ channel among M channels having indices from '0' to 'M−1'. Here, L may be a value greater or less than K. The control unit 330 compares the frequency of the $N^{th}$ channel with those of the $L^{th}$ channel and the $K^{th}$ channel to determine whether the value obtained by subtracting the frequency of the $K^{th}$ channel from two-fold of the frequency of the $L^{th}$ channel is equal to the frequency of the $N^{th}$ channel in step 819. That is, the control unit 330 determines whether the frequencies of the $N^{th}$ channel, the $L^{th}$ channel, and the $K^{th}$ channel fulfill a preset condition of Equation (10) below.

$$2f_L - f_k = f_N \quad (10)$$

If the value obtained by subtracting the frequency of the $K^{th}$ channel from two-fold of the frequency of the $L^{th}$ channel is equal to the frequency of the $N^{th}$ channel in step 819, the control unit 330 determines the IDI of the $L^{th}$ channel and the $K^{th}$ channel to the $N^{th}$ channel in step 821. The IDI may be determined using RSSIs of the $L^{th}$ channel and the $K^{th}$ channel retrieved from the channel information table. That is, the control unit 330 determines the IDI by subtracting the $IMD_S$ from the average of the RSSIs of the $L^{th}$ channel and the $K^{th}$ channel. The IDI may be determined using Equation (11) below.

$$IDI = \frac{P_L + P_K}{2} - IMD_S \quad (11)$$

The control unit 330 determines whether multiple pairs of the $L^{th}$ channel and the $K^{th}$ channel exist in step 823. If there are multiple pairs of the $L^{th}$ channel and the $K^{th}$ channel, e.g., C pairs of the $L^{th}$ channel and the $K^{th}$ channel exist, the control unit 330 determines the sum of IDIs of the C pairs to the $N^{th}$ channel in step 825. The sum of the IDIs may be determined using Equation (12) below.

$$IDI_N = IDI_{N_0} + IDI_{N_1} + \ldots + IDI_{N_{c-1}} \quad (12)$$

The control unit 330 determines ESINR of the $N^{th}$ channel in step 827. Here, the control unit 330 determines the ESINR of the $N^{th}$ channel using the RSSI, the ACI, and the IDI. The ESINR may be determined using Equation (13) below:

$$ESINR = 10\log10\left(\frac{10^{(P_N-No)/10}}{1+10^{(IDI_N-No)/10}+10^{(PACI_{N+1}-No)/10}+10^{(PACI_{N-1}-No)/10}}\right) \quad (13)$$

Returning to FIG. 5, once the ESINR is determined, the control unit 330 increments N by 1 in step 531 and determines whether N is equal to M in step 533. That is, the control unit 330 determines whether the ESINRs of all the M channels within the channel information table have been determined. If N is not equal to M, the control unit 330 repeats steps 519 to 533. The control unit 330 updates the channel information table with the determined ESINR. The channel information table may be stored in the memory unit 340 in the form of Table 2 below:

TABLE 2

| Channel Index | RSSI | ESINR | Service List |
|---|---|---|---|
| 0 | −35 | 3.5 | Program A, B |
| 1 | −78 | N/A | N/A |
| 2 | −57 | 12 | Program C |
| . | . | . | . |
| . | . | . | . |
| . | . | . | . |
| N − 1 | −65 | N/A | N/A |
| N | −88 | 7.4 | Program B |
| N + 1 | −45 | 17.1 | Program C |
| . | . | . | . |
| . | . | . | . |
| . | . | . | . |
| M − 1 | −67 | 8 | Program F |

The control unit 330 selects an optimum channel in step 535. That is, the control unit 330 compares the ESINRs of the channels within the channel information table with each other and selects the channel having the greatest ESINR among the M channels. At this time, the control unit 330 may group the channels by referencing the service list and compare the ESINRs of channels within the group. The control unit 330 may then select the channel having the highest ESINR. For example, when the broadcast data of program C is requested, the control unit 330 may determine the channel indices 2 and N−1 proving the program C by referencing the service list and then compare the ESINRs of channel 2 and N−1 with each other. In this case, since the ESINR of channel N−1 is greater than the ESINR of channel 2, the control unit 330 selects channel N+1. Finally, the control unit 330 configures the broadcast receiver to receive the broadcast data on the selected channel in step 537.

In an exemplary implementation, the control unit 330 may select the channel having the highest RSSI among a plurality channels. The control unit 330 may also select the channel having the least ACI and/or the least IDI among a plurality channels. The control unit 330 may also select the channel of which RSSI is relatively high and at least one of the ACI and the IDI is relatively low.

Although the broadcast receiver determines a per-channel ACI and the IDI in order and then determines the ESINR using the ACI and IDI, the exemplary embodiments of the present invention are not limited thereto. For example, the present invention may be implemented such that the broadcast receiver determines the IDI and the ACI in order and then determines the ESINR based on the IDI and the ACI.

Although the broadcast receiver determines and compares the ESINRs of the plural channels and then selects the channel having the highest ESINR, the exemplary embodiments of the present invention are not limited thereto. For example, the present invention may be implemented such that the broadcast receiver determines and compares the ESINRs of some of the plural channels and then select the optimum channel. In this case, the broadcast receiver may be configured to group the channels by referencing the service list of the channel information table and determine the ESINRs of the channels in the group.

Although the broadcast receiver scans a plurality of channels in a sleep state, determines the RSSIs of the channels in an active state, and selects one of the channels based on the RSSIs, the exemplary embodiments of the present invention are not limited thereto. For example, the present invention may be implemented such that the broadcast receiver scans a plurality of channels and determines the RSSIs of the channels in the sleep state and then selects one of the channels based on the RSSIs in the active state. In this case, the broadcast receiver may be configured to update the channel information table in the sleep state but not in the active state.

In the exemplary embodiments of the present invention, the broadcast receiver selects one of a plurality of channels based on per-channel interference. That is, the broadcast receiver may estimate the IDI and ACI to each channel based on the per-channel RSSI. Using the IDI and ACI, the broadcast receiver may determine the ESINRs of the channels and take the ESINRs into account to select the optimum channel, thereby resulting in improvement of channel determination accuracy and broadcast data reception performance of the broadcast receiver.

As described above, the channel determination apparatus and method of a broadcast receiver may take the per-channel interference into account to select one of a plurality of channels. The broadcast receiver may estimate the per-channel IDI and ACI by using per-channel RSSIs. Also, the broadcast receiver estimates the per-channel SINRs and takes the per-channel SINRs into account for selecting the best channel, resulting in improvement of the channel determination accuracy and broadcast data reception performance.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A channel determination method of a broadcast receiver, the method comprising:
   estimating, when the broadcast receiver operates in a sleep state over a preset time period, inter-modulation distortion interference of a plurality of channels by scanning the channels; and
   receiving, when the sleep state is transitioned to an active state, broadcast data on a channel having the least inter-modulation distortion interference.

2. The method of claim 1, wherein the estimating of the inter-modulation distortion interference comprises:
   measuring received signal strength indicators of the channel; and
   predicting the inter-modulation distortion interference of the channels by comparing the received signal strength indicators.

3. The method of claim 2, wherein the predicting of the inter-modulation distortion interference comprises:
  determining whether a specific channel and at least one pair of channels fulfill a preset condition of an equation:

$$2f_L - f_k = f_N$$

where $f_N$ denotes the frequency of an $N^{th}$ channel, $f_L$ denotes the frequency of an $L^{th}$ channel, $f_K$ denotes the frequency of a $K^{th}$ channel, and L, K and N denote channel indices; and
  determining, if the channels fulfill the condition, the inter-modulation distortion interference of the paired channels to the specific channel.

4. The method of claim 3, wherein the predicting of the inter-modulation distortion interference comprises:
  determining power gains of the received signal strength indicators of the channels; and
  determining inter-modulation distortion interference suppressions according to the power gains, the inter-modulation distortion interference being determined by subtracting the inter-modulation distortion interference suppressions from an average of the received signal strength indicators of the $L^{th}$ channel and the $K^{th}$ channel, using an equation:

$$IDI = \frac{P_L + P_K}{2} - IMD_S$$

where IDI denotes the inter-modulation distortion interference, $P_L$ and $P_K$ denote the received signal strength indicator of the $L^{th}$ channel and the $K^{th}$ channel, and $IMD_S$ denotes the inter-modulation distortion interference suppressions.

5. The method of claim 3, wherein the predicting of the inter-modulation distortion interference comprises determining, if at least one pair of channels includes multiple pairs of channels, a sum of the inter-modulation distortion interference to the specific channel.

6. The method of claim 2, wherein the estimating of the inter-modulation distortion interference comprises determining adjacent channel interference of other channels to a specific channel by comparing the received signal strength indicators of the specific channel and the other channels.

7. The method of claim 6, wherein the receiving of the broadcast data comprises:
  determining, if each of the received signal strength indicators is at least one of greater than and equal to a minimum threshold, estimated signal to interference plus noise ratios of the channels based on the inter-modulation distortion interference and the adjacent channel interference using an equation:

$$ESINR = 10\log10\left(\frac{1}{1 + 10^{(IDI_N - No)/10} + 10^{(P_{ACI_{N+1}} - No)/10} + 10^{(P_{ACI_{N-1}} - No)/10}}\right)$$

where ESINR denotes the estimated signal to interference plus noise ratio, $IDI_N$ denotes the inter-modulation distortion interference of $N^{th}$ channel, $P_{ACI}$ denotes the adjacent channel interference to the specific channel, and No denotes background noise; and
  selecting the channel having the least estimated signal to interference plus noise ratio among the channels.

8. The method of claim 7, wherein the receiving of the broadcast data comprises:
  determining, if each of the received signal strength indicators is at least one of greater than and equal to the minimum threshold and less than a maximum threshold, the estimated signal to interference plus noise ratio of the channels based on the received signal strength indicators and the inter-modulation distortion interference using an equation:

$$ESINR = 10\log10\left(\frac{10^{(P_N - No)/10}}{1 + 10^{(IDI_N - No)/10} + 10^{(P_{ACI_{N+1}} - No)/10} + 10^{(P_{ACI_{N-1}} - No)/10}}\right)$$

where $P_N$ denotes the received signal strength indicator of the specific channel.

9. A channel determination apparatus of a broadcast receiver, the apparatus comprising:
  a channel scanner for scanning, when the broadcast receiver operates in a sleep state over a preset time period, a plurality of channels to measure received signal strength indicators of the channels;
  an inter-modulation distortion estimator for estimating inter-modulation distortion interference of individual channels by comparing the received signal strength indicators with each other; and
  a channel selector for selecting the channel having the least inter-modulation distortion interference among the channels for receiving broadcast data.

10. The apparatus of claim 9, wherein the inter-modulation distortion estimator determines whether a specific channel and at least one pair of channels fulfill a preset condition of an equation:

$$2f_L - f_k = f_N$$

where $f_N$ denotes the frequency of an $N^{th}$ channel, $f_L$ denotes the frequency of an $L^{th}$ channel, $f_K$ denotes the frequency of $K^{th}$ channel, and L, K and N denote channel indices, and determines, if the channels fulfill the condition, the inter-modulation distortion interference of the paired channels to the specific channel.

11. The apparatus of claim 10, wherein the inter-modulation distortion estimator determines power gains of the received signal strength indicators of the channels and determines inter-modulation distortion interference suppressions according to the power gains, the inter-modulation distortion interference being determined by subtracting the inter-modulation distortion interference suppressions from an average of the received signal strength indicators of the $L^{th}$ channel and the $K^{th}$ channel, using an equation $$IDI = \frac{P_L + P_K}{2} - IMD_S$$

where IDI denotes the inter-modulation distortion interference, $P_L$ and $P_K$ denote the received signal strength indicator of the $L^{th}$ channel and the $K^{th}$ channel, and $IMD_S$ denotes the inter-modulation distortion interference suppressions.

12. The apparatus of claim 10, wherein the inter-modulation distortion estimator determines, if at least one pair of channels includes multiple pairs of channels, a sum of the inter-modulation distortion interference to the specific channel.

13. The apparatus of claim 9, further comprising:
an adjacent channel interference calculator for determining adjacent channel interference of other channels to a specific channel by comparing the received signal strength indicators of the specific channel and the adjacent channels of the specific channel.

14. The apparatus of claim 13, wherein the channel selector determines, if each of the received signal strength indicators is at least one of greater than and equal to a minimum threshold, estimated signal to interference plus noise ratios of the channels based on the inter-modulation distortion interference and the adjacent channel interference, using an equation:

$$ESINR = 10\log 10\left(\frac{1}{1+10^{(IDI_N-No)/10}+10^{(P_{ACI_{N+1}}-No)/10}+10^{(P_{ACI_{N-1}}-No)/10}}\right)$$

where ESINR denotes the estimated signal to interference plus noise ratio, $IDI_N$ denotes the inter-modulation distortion interference of $N^{th}$ channel, $P_{ACI}$ denotes the adjacent channel interference to the specific channel, and No denotes background noise, and selects the channel having the least estimated signal to interference plus noise ratio among the channels.

15. The apparatus of claim 14, wherein the channel selector determines, if each of the received signal strength indicators is at least one of greater than and equal to the minimum threshold and less than a maximum threshold, the estimated signal to interference plus noise ratio of the channels based on the received signal strength indicators and the inter-modulation distortion interference using an equation:

$$ESINR = 10\log 10\left(\frac{10^{(P_N-No)/10}}{1+10^{(IDI_N-No)/10}+10^{(P_{ACI_{N+1}}-No)/10}+10^{(P_{ACI_{N-1}}-No)/10}}\right)$$

where $P_N$ denotes the received signal strength indicator of the specific channel.

* * * * *